United States Patent
Weiss

(10) Patent No.: US 6,779,557 B2
(45) Date of Patent: Aug. 24, 2004

(54) ROTARY DISC VALVE

(75) Inventor: Aharon Weiss, Misgav (IL)

(73) Assignee: Mego Afek Industrial Measuring Instruments, Doar Afek (IL)

(*) Notice: Subject to any disclaimer, the term of this patent is extended or adjusted under 35 U.S.C. 154(b) by 79 days.

(21) Appl. No.: 10/225,435

(22) Filed: Aug. 22, 2002

(65) Prior Publication Data

US 2004/0035474 A1 Feb. 26, 2004

(51) Int. Cl.$^7$ .............................................. F15B 13/042
(52) U.S. Cl. ............................ 137/624.13; 137/624.18; 137/625.11
(58) Field of Search ................. 137/624.13, 624.18, 137/627.5, 625.18, 625.19, 625.46, 625.11

(56) References Cited

U.S. PATENT DOCUMENTS

| | | | |
|---|---|---|---|
| 4,441,523 A | * 4/1984 | Stoll | 137/624.18 |
| 4,478,248 A | * 10/1984 | DeVall et al. | 137/624.13 |
| 4,614,205 A | 9/1986 | Oroskar | |
| 5,014,681 A | 5/1991 | Neeman et al. | |
| 6,345,645 B1 | * 2/2002 | Kenna et al. | 137/625.11 |

FOREIGN PATENT DOCUMENTS

JP            01-145474        6/1989

* cited by examiner

*Primary Examiner*—Kevin Lee
(74) *Attorney, Agent, or Firm*—Browdy and Neimark, P.L.L.C.

(57) ABSTRACT

A multi-port rotary disc valve comprising a stator with a plurality of fluid flow ports and a rotary distributor with a plurality of channels arranged in a channel pattern. The channels are adapted to connect the ports between them and/or to the environment in a plurality of predetermined combinations, each combination being associated with an angular position of the rotary distributor with respect to the stator. The succession of combinations performed during a full or partial unidirectional turn of the rotary distributor constitute a predetermined sequence. The rotary distributor comprises a rotor and a mask mounted movably thereon, the rotor and the mask accommodating the plurality of channels. The mask is adapted to change the channel pattern by changing its position with respect to the rotor, thereby enabling the rotary disc valve to perform different predetermined sequences corresponding to different positions of the mask.

23 Claims, 4 Drawing Sheets

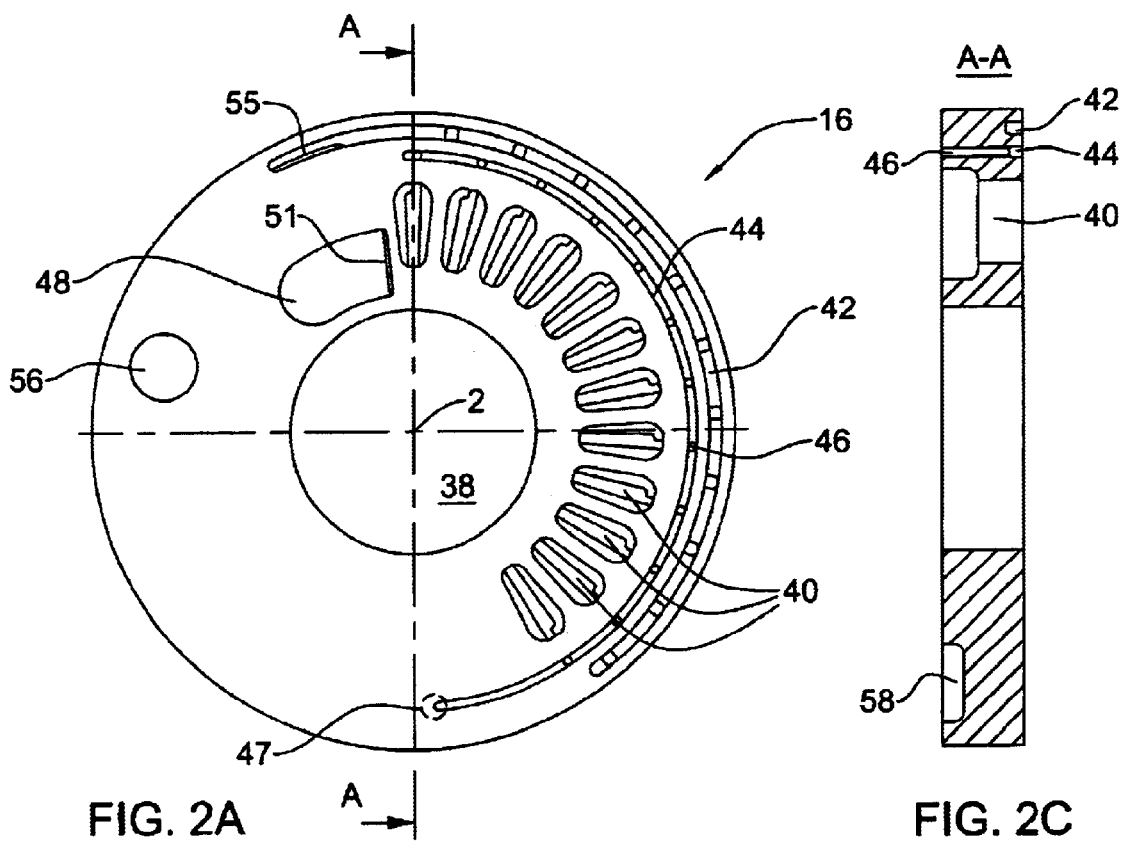
FIG. 2A
FIG. 2C
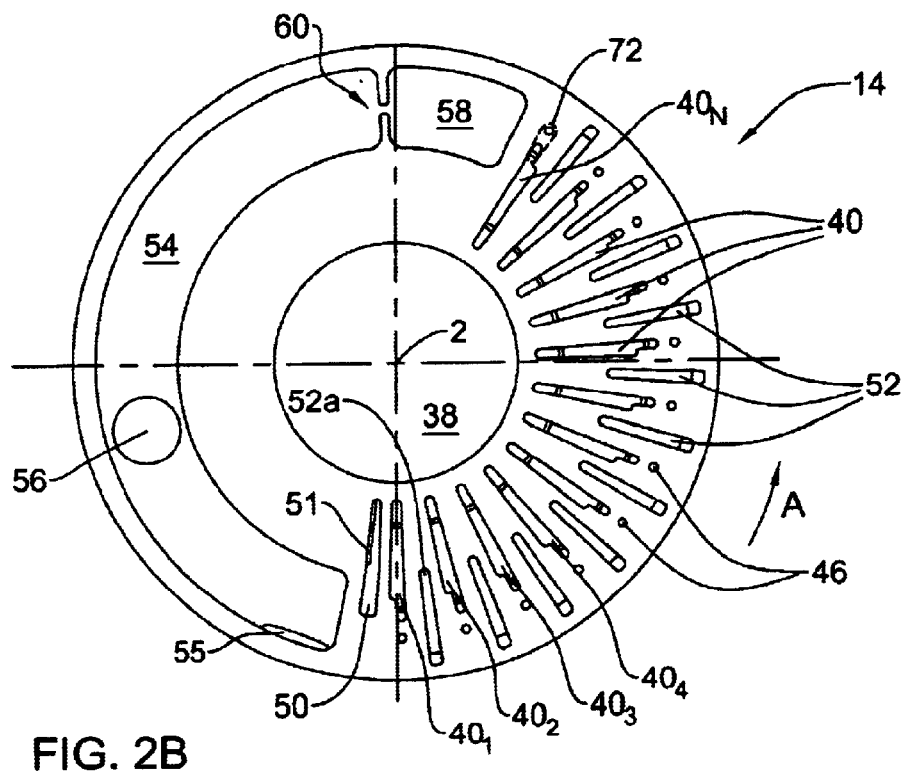
FIG. 2B

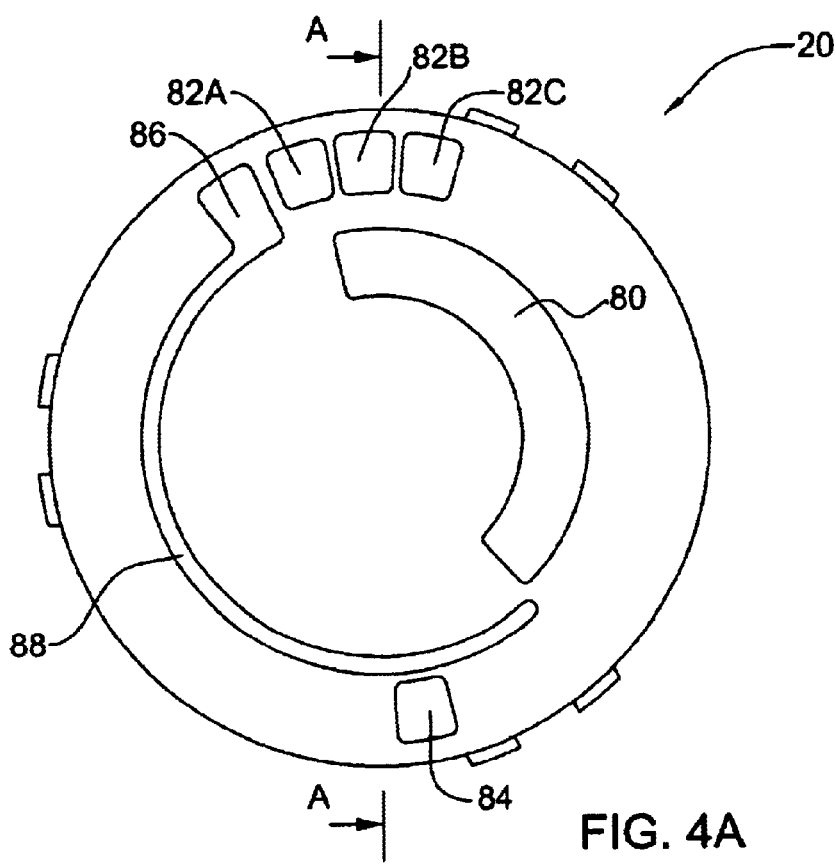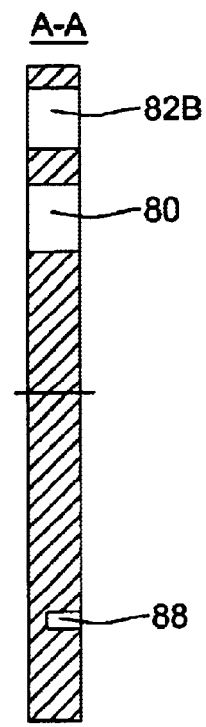
FIG. 4A  FIG. 4C
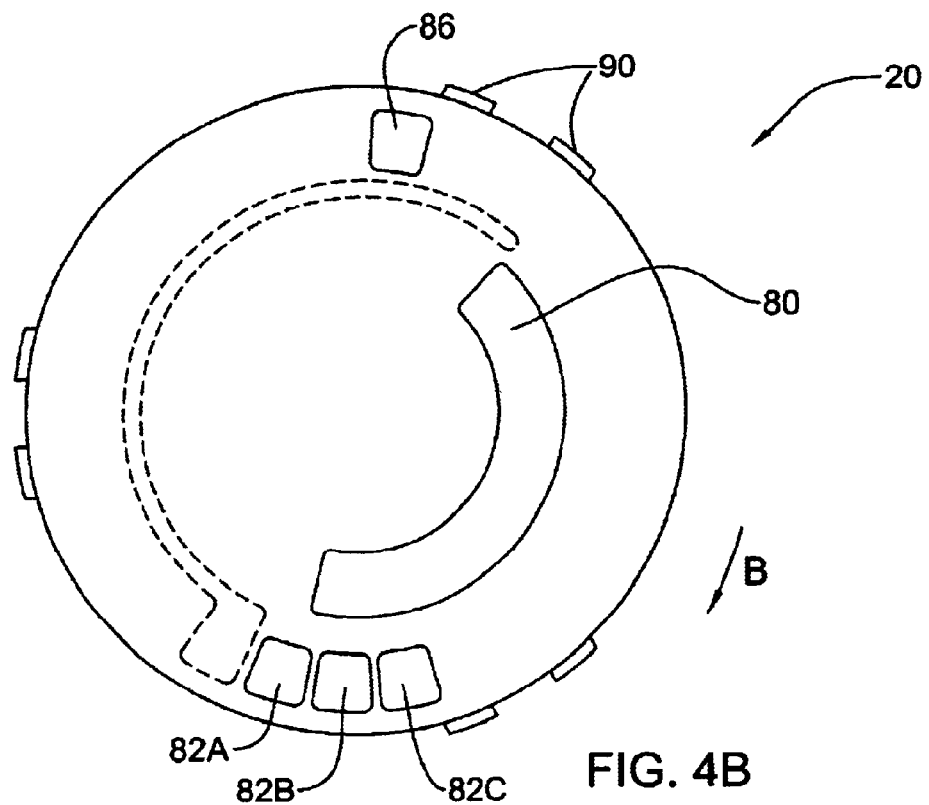
FIG. 4B

ROTARY DISC VALVE

FIELD OF THE INVENTION

This invention relates to rotary disc valves for feeding fluid flow and/or pressure to a plurality of ports, in particular to valves performing a predetermined cycle of feeding operations, such as, for example, numerous cyclical inflating and deflating a plurality of pressure cells in an inflatable device.

BACKGROUND OF THE INVENTION

A rotary disc valve for inflating and deflating pressure cells in a therapeutic sleeve is disclosed in U.S. Pat. No. 5,014,681, incorporated herein by reference. This rotary disc valve comprises two discs: a stator disc with fluid flow ports connectable to a compressor and to the pressure cells, and a rotary distributor disc, the two discs contacting sealingly along a planar interfacing surface perpendicular to the axis of rotation. The ports of the stator disc open at the interfacing surface. The rotary distributor disc has a plurality of U-channels and through-going windows also opened at the interfacing surface. The channels and windows are configured so that during rotation of the rotary distributor disc, the compressor flow is successively directed, through the appropriate ports, to inflate the corresponding pressure cells, which are then successively opened to die atmosphere, all this following a predetermined sequence.

JP 01145474 discloses a rotary disc valve with a similar function where the stator comprises two discs fixed with respect to each other, the stator discs slidingly contacting a rotor distributor disc disposed therebetween. The rotor disc has U-channels and through holes connecting the ports of the stator in various combinations during one turn of the rotor distributor disc.

U.S. Pat. No. 4,614,205 discloses a multiport rotary disc valve with a similar function of simultaneous interconnection of a plurality of conduits in accordance with a predetermined cycle. The stator and the rotary distributor in this rotary valve are assemblies each comprised of two parallel plates or discs. The rotary assembly is sandwiched between two parallel plates of the stator assembly. Crossover pipes extend between the rotor plates to form either U-channels or through-passages similar to the above-cited designs.

The known rotary disc valves are capable of performing one predetermined cycle (sequence) of connections between the stator ports. The connections may be varied in time by controlling the rotational velocity and position of the rotor, but their order is determined by the pattern of the channels in the rotor and the stator.

SUMMARY OF THE INVENTION

In accordance with the present invention, there is provided a multi-port rotary disc valve comprising a stator with a plurality of fluid flow ports and a rotary distributor with a plurality of channels arranged in a channel pattern. The channels are adapted to connect the ports between them and/or to the environment in a plurality of predetermined combinations, each combination being associated with an angular position of the rotary distributor with respect to the stator. A succession of such combinations performed during a full or partial unidirectional turn of the rotary distributor constitute a predetermined sequence. The rotary distributor comprises a rotor and a mask mounted movably thereon, accommodating the plurality of channels. The mask is adapted to change the channel pattern by changing its position with respect to the rotor, thereby enabling the disc valve to perform different predetermined sequences corresponding to different positions of the mask.

In a preferred embodiment the mask and the rotor are coaxial and co-rotatable discs driven by a reversible controllable electric drive. The rotary distributor is mounted rotatably relative to the stator in a first direction only, while the mask disc is mounted rotatably relative to the rotor disc in a second direction only, contrary to said first direction. Thereby, the rotary distributor rotates only when electric drive rotates in the first direction and the mask disc rotates relative to the rotor disc only when the drive rotates in the second direction.

In a further embodiment of the rotary disc valve, the rotor disc has two faces, at least part of the rotary distributor channels connecting them. The first face sealingly contacts with a face of the stator, the connections between the stator ports and the rotary distributor channels being performed via this face. The second face sealingly contacts with a face of the mask disc, and the mask disc changes the channel pattern by switching connections between those channels that exit at the second face.

The rotary disc valve used for inflating and deflating N cells comprises a central inlet port and N outlet ports disposed around the central port. The rotor disc has a feed channel configured so that, during one turn of the rotary distributor, it successively connects the central inlet port to each one of the outlet ports.

The rotary disc valve is also adapted for group exhaust of all N inflated cells. For this purpose, the rotor disc has N through windows connecting the first face to the second face, configured so that, in a predetermined angular position A of the rotary distributor with respect to the stator, the N through windows match the N outlet ports. The mask disc has a group exhaust channel configured so that, in a predetermined angular position B of the mask disc with respect to the rotor disc, the group exhaust channel is connected to all the through windows of the rotor disc. The group exhaust channel is her connectable to a source of vacuum such as the entry of a compressor or pump, thereby enabling a group evacuation of any volumes connected to the N outlet ports of the stator, provided the positions A and B are attained simultaneously.

Preferably, the rotary disc valve is adapted to work as a part of a computerized system for inflating and deflating in cycles N cells connected to the N outlet ports. The stator of the rotary disc valve has N through pressure openings each disposed adjacent to one of the outlet ports, and a pressure channel connecting the pressure openings to a pressure outlet. The rotor disc has a bypass channel configured so as to be able to connect, when rotated, anyone of the outlet ports to the corresponding adjacent pressure opening while keeping the rest pressure openings stopped, thereby enabling the measurement of pressure $P_C$ in a volume connected to anyone outlet port. Preferably, the bypass channel is disposed behind the feed channel with respect to the first direction of rotation, so that the bypass channel is connected to outlet port No. n when, the feed channel is between outlet port No. n+1 and outlet port No. n+2, where n is an ordinal number of an outlet port, n increasing in the first direction. The system comprises a sensor to measure the pressure $P_0$ in the central inlet port, and a sensor to measure the pressure $P_C$ in the pressure outlet. The system is programmed to terminate the inflation of a given cell at a predetermined instant value of the pressure $P_0$ in order to obtain a target established pressure $P_E$ in that cell, and the system is adapted to correct this instant value in a next cycle if the measured pressure $P_C$ in a current cycle is different from the target pressure $P_E$.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 2A, 2B, and 2C are, respectively, lower, upper and cross-sectional views of the stator disc shown in FIG. 1;

FIGS. 4A, 4B, and 4C are, respectively, lower, upper and cross-sectional views of the mask disc shown in FIG. 1.

DETAILED DESCRIPTION OF THE INVENTION

Figure 1:
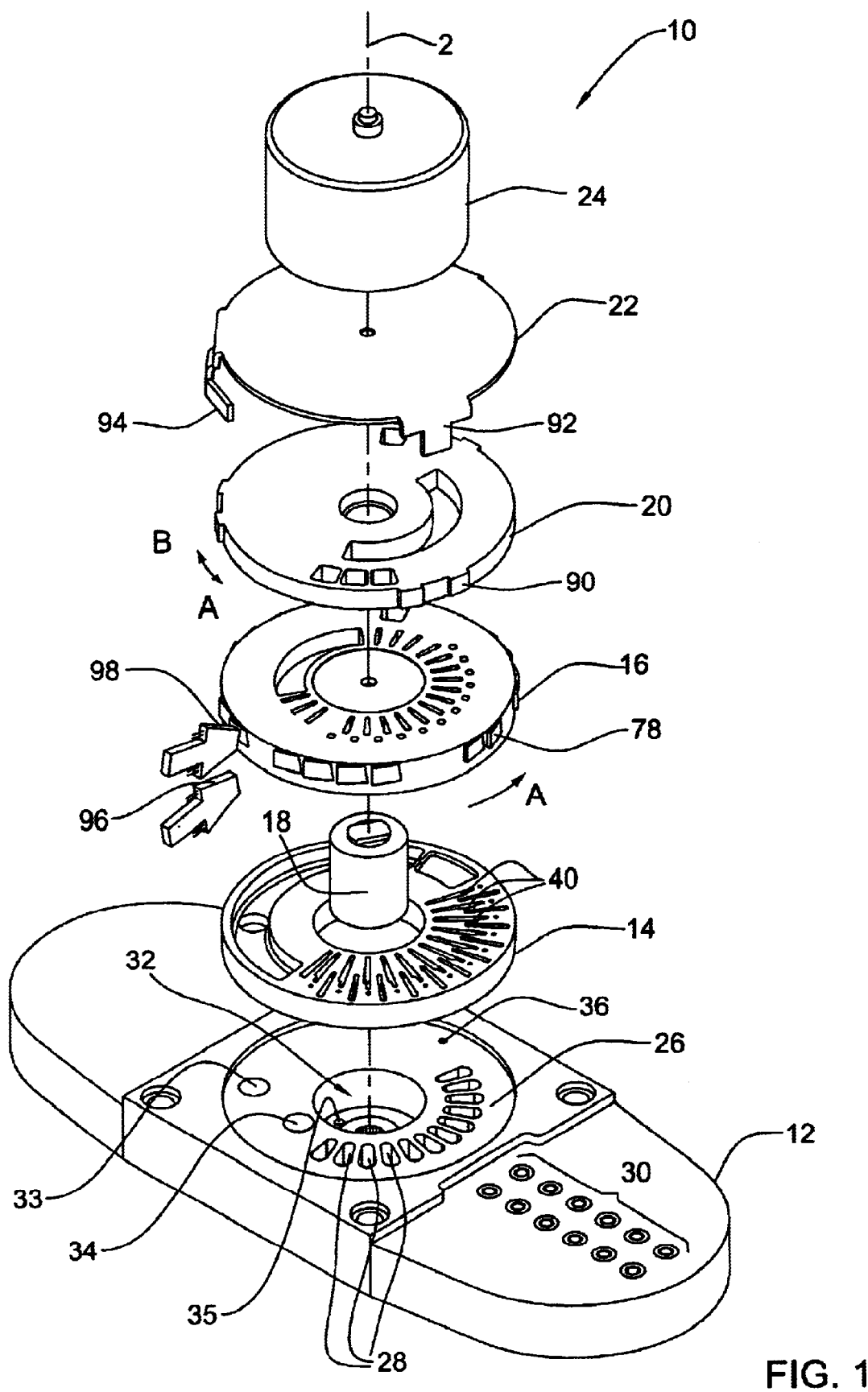
FIG. 1 is an exploded view of a rotary disc valve according to the present invention.

With reference to FIG. 1, a multi-port rotary disc valve 10 according to the present invention is shown for use, for example, with an inflatable device having a plurality of pressure cells. One example of such inflatable device will be used in the explanations, without any limitation to the scope of the invention. The device is a therapeutic massage sleeve with N annular cells embracing a human's limb (not shown here) as described in the incorporated U.S. Pat. No. 5,014,681. The annular cells are close to each other or even slightly overlapping, and they need to be cyclically inflated or deflated in different sequences depending on the therapeutic procedure.

The rotary disc valve 10 comprises a housing 12, a stator disc 14, a rotor disc 16, a mask disc 20, a coupling disc 22, and a drive motor 24, all adapted for coaxial assembly along axis 2 of the valve.

The housing 12 is a massive plate with a circular recess 26 accommodating the stator 14, with a plurality of N outlet windows 28 disposed in a fan-like manner around the axis 2 at a predetermined uniform angular distance $\Delta\alpha$ from each other. The outlet windows 28 are connected by individual channels (not seen) to outlet ports 30. In operation, the outlet ports 30 are connected by pipes to the inflatable cells of an inflatable device, such as a massage sleeve (not shown). The housing 12 has also a central inlet port 32 connectable to a source of pressurized fluid such as the discharge of an air compressor (not shown), an exhaust port 34, and a vacuum port 33 connectable to a source of vacuum such as the entry of an air compressor. The housing also has a channel 35 for measuring the air pressure of the inlet flow and a channel 36 for measuring the air pressure in inflated cells, as will be explained in more detail below.

With reference also to FIGS. 2A, 2B and 2C, the stator 14 is a disc with a wide axial opening 38 and with a plurality of various through windows, recesses and channels. In particular, the stator 14 has N through outlet windows 40 matching the outlet windows 28 of the housing, and N through pressure openings 46 each disposed adjacent to an outlet window 40. At the lower side of the stator that faces the housing 12 (FIG. 2A), there are the exit sides of the N outlet windows 40, an arcuate vacuum channel 42 concentrically embracing the windows 40, and an arcuate cell pressure channel 44 concentric with the vacuum channel 42 internally connected to the N pressure openings 46. The end 47 of the cell pressure channel 44 matches the inlet of the measurement channel 36 when the stator is mounted in the housing. An exhaust recess 48 located to match the exhaust port 34 of the housing 12 is in fluid communication with an exhaust window 50 at the upper side of the stator (FIG. 2B), though a slit 51. Also at the upper side of the stator, which faces the rotor 16, are the entrance sides of the outlet windows 40, and a plurality of recesses 52 disposed in a fan-like manner between the outlet windows 40. The recesses 52 are displaced farther from the disc axis than the windows 40 and are internally connected to the exhaust channel 42 on the lower side of the disc. The pressure openings 46 connect the cell pressure channel 44 at the lower surface of the stator to the stator upper surface facing the rotor 16. A long arcuate recess 54 has a wide opening 56 adapted to match the vacuum, port 33 in the housing 12 and is in fluid communication with the exhaust channel 42 through a slit 55. An extension 58 of the recess 54 is connected thereto by a narrow passage 60.

The stator 16 is sealingly mounted to the housing 12, in the recess 50 thereof, and operates as one integral body with the housing.

Figure 3A:
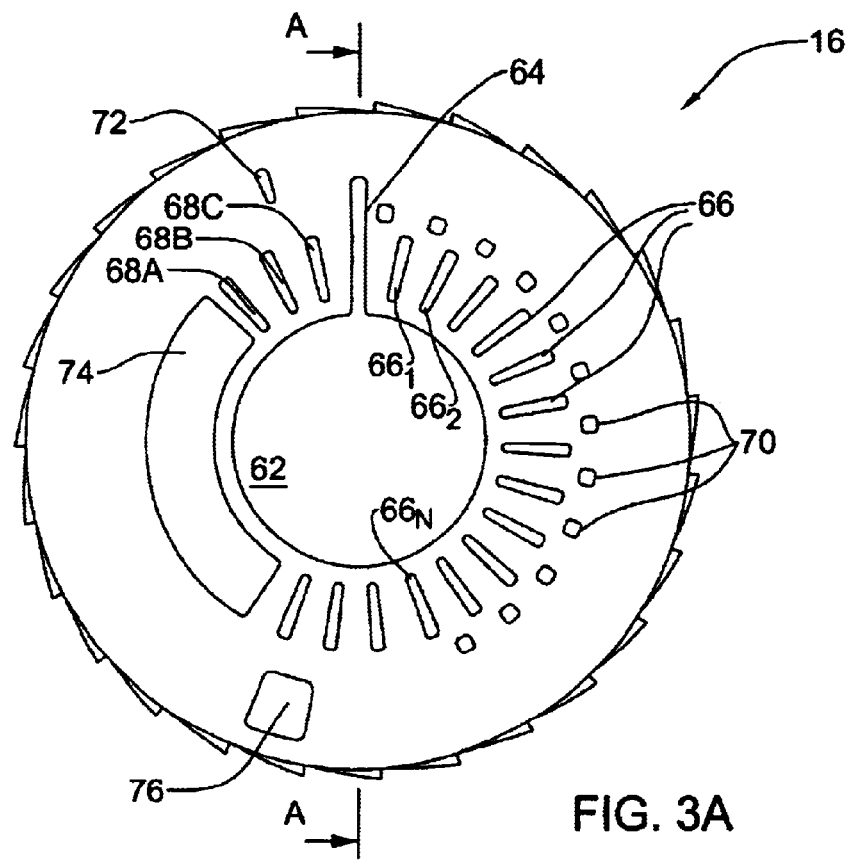
FIGS. 3A, 3B, and 3C are, respectively, lower, upper and cross-sectional views of the rotor disc shown in FIG. 1.
Figure 3C:
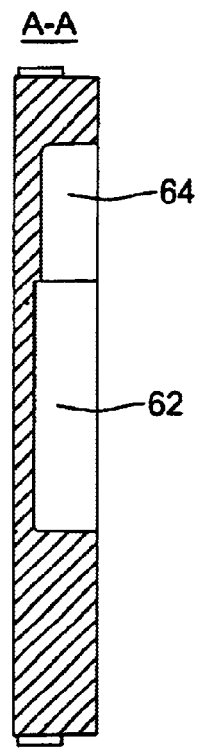
Figure 3B:
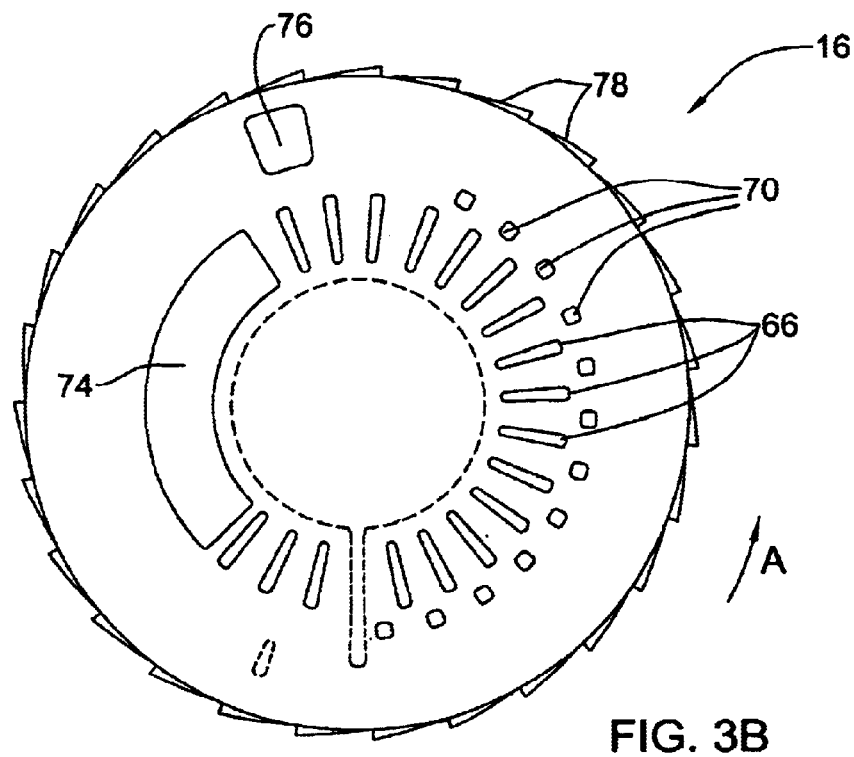

With reference to FIGS. 3A, 3B and 3C, the rotor disc 16 has a blind central recess 62 at the lower side which faces the stator 14 (FIG. 3A). At the same side, the rotor has a radial feed channel 64 extending from the recess 62 to a radius suitable to cover the outlet windows 40 on the stator 14 when the valve is assembled. A plurality of N+3 windows 66 are disposed in fan-like manner at one side of the feed channel 64. The windows 66 are at an angular distance $\Delta\alpha$ from each other and from the feed channel 64 so as to be able to match the windows 40 on the stator 16 when the valve is assembled. A group of three windows 68A, 68B, and 68C similar to the windows 66 are located at the other side of the feed channel 64. A group of N openings 70 are disposed between the windows 66 farther from the axis 2 of the valve than the outer edge of the windows 66. A single bypass recess 72 is placed in one and a half angular steps $\Delta\alpha$ from the feed channel 64. The recess 72 has such radial extent that it can cover and establish fluid communication between a window 40 and a corresponding pressure opening 46 on the stator, when the valve is assembled (shown also in FIG. 2B, in broken line). The rotor has also a wide window 74 completing the arc of windows 66 and 68 to a full ring. A wide exhaust port 76 is disposed on the rotor farther from the axis 2 than the openings 70, and is configured to match the recess 54 on the stator. On the circumference of the rotor disc 16, there is a plurality of inclined teeth 78 constituting part of a ratchet mechanism, adapted for engagement with the coupling disc 22 (FIG. 1).

With reference to FIGS. 4A, 45 and 4C, the mask disc 20 has a wide arcuate window 80 with radial extent similar to that of the windows 66 on the rotor 16 and angular extent suitable to cover N windows 66, when the mask disc 20 is mounted on the rotor 16. The mask disc 20 further has a group of three adjacent exhaust windows 82A, 82B and 82C, and one remote exhaust window 84, each adapted to match the exhaust port 76 on the rotor 16. At the lower side of the mask facing the rotor 16, there is a group exhaust recess 86, shaped similarly to, and disposed adjacent the group of windows 82. The group exhaust recess 86 communicates with an arcuate exhaust channel 88 which has angular extent, radial position and width suitable to match the openings 70 and to connect them all via the exhaust recess 86, to the exhaust port 76 on the rotor, when the mask disc 20 is mounted on the rotor 16. On the circumference of the mask disc 20, there are three pairs of teeth 90 for coupling the mask disc to the coupling disc 22 (FIG. 1).

With reference to FIG. 1, the coupling disc 22 is a thin disc with three straight teeth 92 matching the teeth 90 on the mask disc 20, and a spring pawl 94. The coupling disc is fixed to the shaft (not seen) of the electric motor 24.

The electric motor 24 is reversible and controllable by angular velocity and angular coordinate. The control system (not shown) comprises inter alia a sensor 96 for the angular position of the rotor disc 16, and a sensor 98 for the angular position of the mask disc 20.

In assembled condition, the rotor 16 sits on the stator 14 and is rotatably connected to the housing 12 by means of a one-way bearing 18 allowing rotation of the rotor only in direction A. The mask disc 20 sits rotatably on the rotor 16. The coupling disc 22 engages the mask disc 20 by means of the teeth 90 and 92 for rotation of the mask in any direction. At the same time, the spring pawl 94 of the coupling disc 22 engages the teeth 78 of the rotor disc 16 forming a ratchet mechanism allowing the mask 20 to rotate with respect to the rotor 16 only in direction B. The stator 14, the rotor 16, and the mask 20 are pressed to each other for air tightness by a spring means (not shown). Thus, when the motor 24 rotates in direction A, the mask disc 20 and the rotor 16 rotate together, as a single body, and constitute a rotary distributor interacting with the stator 14 to feed the air coming from the air compressor to the outlet ports 30, in a predetermined sequence. This manner of rotation is called "operational mode". When the motor rotates in direction B, the rotor 16 stands still with respect to the stator 14 while the mask disc 20 slips relative to the rotor 16 to change its angular position relative to the rotor, thus making a different rotary distributor capable of performing a different predetermined sequence. This manner of rotation is called "setup mode". Thereby, the inventive rotary disc valve can perform the function of several conventional multi-port disc valves.

A number of predetermined sequences are illustrated below by way of examples only.

Sequence A: Sequential Inflation—simultaneous deflation.

The mask disc 20 is rotated in direction B relative to the rotor 16 to a position where the exhaust window 84 matches the exhaust port 76, and at the same time the wide arcuate window 80 of the mask covers all N windows 66 of the rotor. The initial position of the rotor 16 with respect to the stator 14 is with the feed channel 64 over the exhaust window 50. This is a stand-by or idle mode where the pressurized air from the compressor comes via the central inlet port 32 and the axial opening 38 to the recess 62 and the feed channel 64, and leaves the rotary valve through the exhaust window 50 and the exhaust port 34.

As the rotor 16 starts to rotate in direction A, the feed channel 64 moves over the nearest outlet window $40_1$ which is connected to the first annular cell and it starts to inflate. After a predetermined time, or after reaching a predetermined pressure in the first cell, the rotor moves on and the feed channel 64 now matches the nearest recess $52_1$ which is connected to the exhaust channel 42, while the fluid communication with the first cell is stopped. This is also a stand-by mode. After a predetermined time, the rotor moves on and the feed channel matches the next outlet window $40_2$ to inflate the next cell. Thus, all N cells are successively inflated until the feed channel reaches the last outlet window $40_N$. After a predetermined time, the rotor makes about ½ turn so that all N outlet windows 40 match the windows 66 and communicate with the atmosphere via the window 80 on the mask. Thereby, the cells are deflated simultaneously and the sequence A is completed.

Sequence B: Sequential Inflation—sequential deflation.

The mask disc 20 is rotated in direction B relative to the rotor 16 to a position where the exhaust window 82A matches the exhaust port 76, and at the same time the wide arcuate window 80 of the mask covers the windows 68A, 68B and 68C of the rotor. The initial position of the rotor 16 with respect to the stator 14 is with the feed channel 64 over the exhaust window 50, as above.

As the rotor 16 starts to rotate in direction A, the feed channel 64 moves over the nearest outlet window $40_1$ which is connected to the first annular cell, and it inflates. Then, the rotor moves on and the feed channel 64 matches the nearest recess $52_1$ (stand-by mode). After a predetermined time, the rotor moves on and the feed channel 64 matches the next outlet window $40_2$ to inflate the next cell. At the same tine, the window 68A of the rotor matches the first outlet window $40_1$ and the first cell releases its pressure to the atmosphere through the window 80. Thus, all N cells are successively inflated and each one is deflated when the next cell is inflated.

If, alternatively, the exhaust window 82B of the mask is fixed opposite the exhaust port 76 of the rotor, then the window 80 of the mask will cover only windows 68B and 68C of the rotor. Thus, the outlet window $40_1$ will be opened to the atmosphere only when the window 68B matches it, which will happen when the feed channel 64 reaches the outlet window $40_3$. In a similar manner, when the exhaust window 82C of the mask is fixed opposite the exhaust port 76, the outlet window $40_1$ opens to the atmosphere only when the window 68C matches it and this happens when the feed channel 64 reaches the outlet window $40_4$. Thereby, the three exhaust windows 82A, 82B and 82C of the mask, with the cooperation of the three windows 68A, 68B and 68C of the rotor, provide for three sequences B each characterized by different delay of the cell deflation.

Sequence C: Active suction.

The mask disc 20 is rotated in direction B relative to the rotor 16 to a position where the group exhaust recess 86 matches the exhaust port 76. The rotor 16 is now rotated, together with the mask disc 20, in direction A with respect to the stator 14 to a position where the feed channel 64 is over the exhaust window 50, in stand-by mode as above. The exhaust port 76 now is positioned over the arcuate recess 54 and is in fluid communication with the vacuum port 33 which is connected to the compressor entry. The arcuate exhaust channel 88 covers all openings 70 of the rotor which, in their turn, match the inlet windows 40. Thereby, the compressor suction provides for the rapid deflation of the massage sleeve cells.

The rotary disc valve of the present invention may be advantageously used in a computerized system for inflating and deflating in cycles a plurality of cells connected to the outlet ports, for example in the therapeutic sleeve shown in U.S. Pat. No. 5,014,681. The system is programmable to terminate the inflation of each cell when a predetermined instant pressure $P_0$ is reached (i.e. by moving the feed channel 64 to stand-by position or to the next cell). However, the instant pressure $P_0$ during the inflation is transient and even if the system terminates the inflation at $P_0=P_E$, the established pressure $P_C$ in the cell at a short time may turn out different from the target pressure $P_E$. Another factor that may affect the established pressure $P_C$ in the cell is the inflation of the next adjacent cell, especially when the cells overlap. The computerized system that controls the inflation-deflation process needs to measure the actual established pressure $P_C$ in the cell in order to compare it to the target pressure $P_E$ and to try to minimize the difference $\Delta P=P_E-P_C$ when the next turn to inflate the same cell comes, by shifting the predetermined pressure $P_0$ for this particular cell.

The rotary disc valve facilitates the above process of precise achievement of target established pressure $P_E$ in the inflated cells. The instant pressure $P_0$ is measured at the central inlet port of the rotary valve, by means of a pressure sensor connected to the channel 35. The measurement of the established cell pressure $P_C$, after the next cell is inflated, is provided by means of the bypass recess 72 on the rotor, which is located one-and-half angular steps $\Delta\alpha$ behind the feed channel 64 with respect to rotation direction A. When the feed channel 64 has inflated two successive cells via the respective outlet windows 40 and is in stand-by position halfway to a third outlet window 40, then the bypass recess 72 covers the first outlet window 40 and a corresponding opening 46 on the stator. Thereby, fluid communication is provided between the first inflated cell and the cell pressure channel 44 that is connected to a pressure sensor via the measurement channel 36, and the established cell pressure $P_C$ is measured.

Although a description of specific embodiments has been presented, it is contemplated that various changes could be made without deviating from the scope of the present invention. For example, the mask may be movable with respect to the rotor not only by way of rotation but in any other way providing commutation of the rotor distributor channels; the mask may comprise plural movable parts; the rotor and the mask may be driven by other means than electric motor; the rotary distributor may be driven by one motor and the mask may be driven by another motor; the discs may contact therebetween along a conical or other surface of rotation, etc. Also, the stator may comprise two discs with inlet or outlet windows at either side of the rotary distributor in a manner similar to U.S. Pat. No. 4,614,205 or to JP 01145474, which are incorporated herein by reference.

What is claimed is:

1. A multi-port rotary disc valve comprising a stator with a plurality of fluid flow ports and a rotary distributor with a plurality of channels arranged in a channel pattern, said channels being adapted to connect said ports between them and/or to the environment in a plurality of predetermined combinations, each combination being associated with an angular position of the rotary distributor with respect to the stator, a succession of such combinations performed during a full or partial unidirectional turn of said rotary distributor constituting a predetermined sequence; said rotary distributor comprising a rotor and a mask mounted movably thereon, the rotor and the mask accommodating said plurality of channels, and said mask being adapted to change said channel pattern by changing its position with respect to said rotor, thereby enabling said disc valve to perform different predetermined sequences corresponding to different positions of the mask.

2. A rotary disc valve according to claim 1, wherein said mask is movable with respect to said rotor by way of rotation.

3. A rotary disc valve according to claim 2, wherein the rotation of said rotary distributor and the rotation of said mask are performed around the same axis.

4. A rotary disc valve according to claim 3, wherein said rotor and said mask are coaxial and co-rotatable discs.

5. A rotary disc valve according to claim 1, wherein said rotary distributor is rotatable by means of an electric drive.

6. A rotary disc valve according to claim 1, wherein said mask is movable by means of an electric drive.

7. A rotary disc valve according to claim 4, wherein said rotary distributor is rotatable relative to said stator in a first direction only.

8. A rotary disc valve according to claim 7, wherein said mask disc is rotatable relative to said rotor disc in a second direction only, contrary to said first direction.

9. A rotary disc valve according to claim 8, wherein the rotation of said mask disc in said second direction only is provided by a ratchet and pawl mechanism.

10. A rotary disc valve according to claim 8, further comprising a single reversible electric drive whereby said rot distributor rotates only when said drive rotates in said first direction and said mask disc rotates relative to said rotor disc only when said drive rotates in said second direction.

11. A rotary disc valve according to claim 4, wherein said rotor disc has a first face sealingly contacting with a face of said stator, and the connections between said stator ports and said rotary distributor channels are performed via said first face.

12. A rotary disc valve according to claim 11, wherein said rotor disc has a second face sealingly contacting with a face of said mask disc, at least part of said plurality of channels exit at said second face, and said mask disc changes said channel pattern by switching connections between said part of channels exiting at the second face.

13. A rotary disc valve according to claim 12, wherein said plurality of fluid flow ports comprises a central inlet port and N outlet ports disposed around said central port.

14. A rotary disc valve according to claim 13, wherein said rotor disc has a feed channel so configured that, during one turn of the rotary distributor, said feed channel successively connects said central inlet port to each one of said N outlet ports.

15. A rotary disc valve according to, claim 14, wherein said rotor disc has N through windows connecting said first face to said second face, so configured that, in a predetermined angular position A of the rotary distributor with respect to said stator, said N through windows match said N outlet ports.

16. A rotary disc valve according to claim 15, wherein said mask disc has a group exhaust channel so configured that, in a predetermined angular position B of said mask disc with respect to said rotor disc, said group exhaust channel is connected to all said N through windows of the rotor disc and is connectable to a source of vacuum, thereby enabling a group evacuation of any volumes connected to said N outlet ports of the stator, provided the positions A and B are attained.

17. A rotary disc valve according to claim 16, wherein said source of vacuum is an entry port of a compressor or pump.

18. A rotary disc valve according to claim 16, wherein said stator has a vacuum port connectable to said source of vacuum, and said rotor disc has an exhaust port so configured that, in said position B of the mask disc, it is connected to said group exhaust channel, and in said position A of the rotary distributor, it matches said vacuum port.

19. A rotary disc valve according to claim 14, wherein said plurality of fluid flow ports further comprises a number of exhaust ports connected to the ambient atmosphere and disposed at least in part intermediate to said N outlet ports so that said feed channel, during a turn of said rotary distributor, can communicate with one of said exhaust ports while not communicating with any of said N outlet ports.

20. A rotary disc valve according to claim 14, wherein said stator has N through pressure openings each disposed adjacent to one of said N outlet ports, and a pressure channel connecting said pressure openings to a pressure outlet connectable to a pressure sensor, said rotor disc has a bypass channel so configured as to be able to connect, when rotated, anyone of said N outlet ports to the corresponding adjacent pressure opening while keeping the rest pressure openings stopped, thereby enabling measurement of pressure $P_C$ in a volume connected to said anyone outlet port by means of said sensor.

21. A rotary disc valve according to claim 20, wherein said bypass channel is disposed behind said feed channel with respect to said first direction of rotation so that said bypass channel is connected to outlet port No. n when said feed channel is between outlet port No. n+1 and outlet port No. n+2 where n is an ordinal number of one of said N outlet ports, n increasing in said first direction.

22. A rotary disc valve according to claim 21, constituting a part of a computerized system for inflating and deflating in cycles N cells connected to said N outlet ports, by rotating said rotary distributor, said system further comprising a sensor to measure the pressure $P_0$ in said central inlet port and said pressure sensor to measure the pressure $P_C$ in said pressure outlet, said system being programmable to terminate the inflation of one of said N cells at a predetermined instant value of the pressure $P_0$ in order to obtain a target established pressure $P_E$ in said one cell, and said system being adapted to correct said instant value in a next cycle if the measured pressure $P_C$ in a current cycle is different from the target pressure $P_E$.

23. A rotary disc valve according to claim 1, wherein said stator comprises two plates, each plate accommodating part of said fluid flow ports, with said rotary distributor sandwiched between said two plates.

* * * * *